BENSON & DAY.
Vacuum Pan.
No. 5,691.
Patented Aug. 1, 1848.
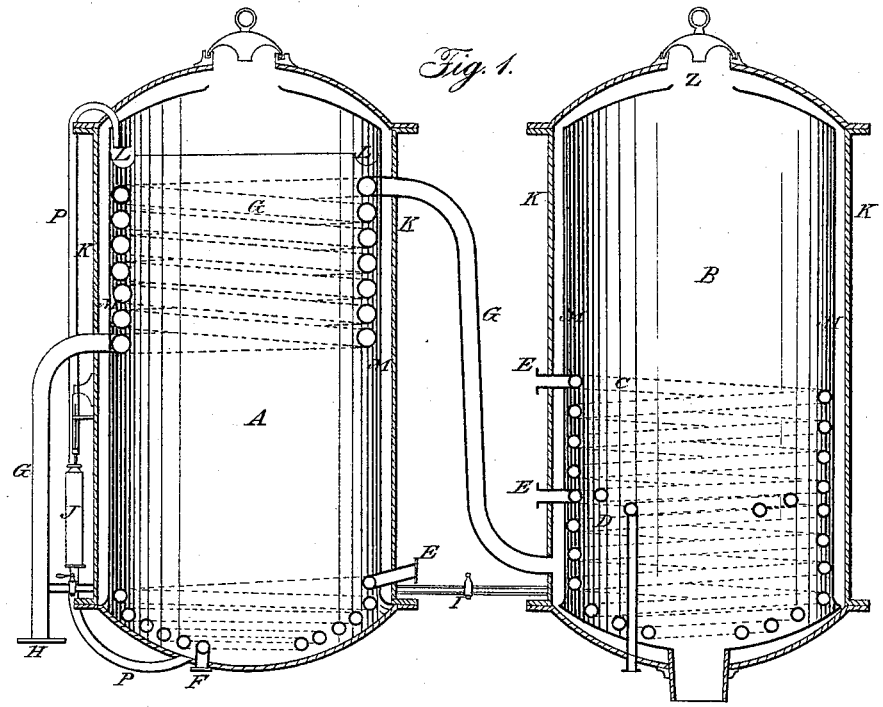
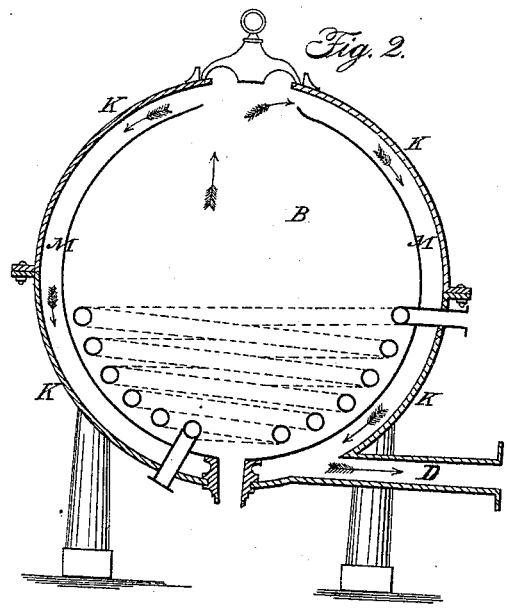

UNITED STATES PATENT OFFICE.

JOHN BENSON AND JAMES DAY, OF BROOKLYN, NEW YORK.

IMPROVEMENT IN SUGAR-PANS.

Specification forming part of Letters Patent No. 5,691, dated August 1, 1848.

*To all whom it may concern:*

Be it known that we, JOHN BENSON and JAMES DAY, of Brooklyn, in the county of Kings and State of New York, have invented sundry new and useful Improvements in Sugar-Pans; and we do hereby declare the following to be a full, clear, and exact description thereof, reference being had to the accompanying drawings, making a part of this specification.

The nature of our improvements consist, first, in constructing and combining a series of sugar-pans with each other in such a manner that any one of them can be used at pleasure, either as an evaporating or a concentrating vacuum pan.

It consists, second, in the surrounding and inclosing the sugar-pans with a metallic casing, leaving an interstitial space between the two communicating with an aperture in the top of the sugar-pan, the object of which will be hereinafter set forth.

Our improvements consist, third, in the arrangement of the steam-pipes in the sugar-pans in independent series of two or more, for the purpose of regulating and graduating the amount and position of the heating-surface, as the condition and quality of the concentrating sirup may require.

It consists, fourth, in the exhausting of the aqueous vapor from the vacuum-pan through a pipe, G, passing from the space between the pan and casing into the evaporating-pan, where, after coiling a number of times around near the top of the same, it passes out through the sides of the pan and casing to the air-pump.

The object of carrying the aqueous vapor from the vacuum-pan through the evaporating-pan is that it may subserve the purpose of an evaporating-pipe, a portion of heat being extracted from the same by pumping a quantity of sirup from the bottom of the evaporating-pan to the top into a perforated trough, L, through which it drips onto the spiral exhaust-pipe.

The object of inclosing the sugar-pans within an external casing is to form a space between them to receive the aqueous vapor from the pans, and protect the pans from the cooling influence of the atmosphere, thereby preventing the condensation of the vapor on the upper surface of the pans and facilitating its condensation after its passage into the space between the pan and casing by the large surface exposed to the action of the atmosphere. In the old style of vacuum-pan it has been found that from thirty to forty per cent. of the aqueous vapor is condensed upon the sides and top of the pan, and is thrown back in a liquid form to be re-evaporized, causing a proportionate loss of time, fuel, and labor.

In the accompanying drawings, Figure 1 is a vertical section of an evaporating and a vacuum pan as they are fitted up for plantation use. Any number may be combined that may be required. Fig. 2 is a vertical section of a spherical form of condensing-pan and casing as fitted up for a refinery.

Our improved sugar-pans and casings may be constructed of any form that may be deemed preferable.

A is the evaporator. B is the concentrator or vacuum pan. K K are the casings inclosing the pans A and B; C, steam-pipe for heating and evaporating sirup to a point prior to the concentrating-point; D, pipe to complete the evaporation and bring the sirup to concentrating-point; E E, flanges to connect the evaporating-pipes with the main steam-pipe; F F, flanges to connect evaporating-pipes with waste-pipe; G, exhaust-pipe for vacuum-pan B; H, flange to connect G with the air-pump; I, pipe with stop-cock connecting the spaces M M between the pans A and B and their casings. By opening this connection between the two the evaporating-pan A can at any time be converted into a vacuum (or concentrating) pan; J, small pump for pumping the sirup from the bottom of the evaporating-pan A into the distributing trough or cylinder L at the top of the same through the pipe *p*. The aqueous vapor rising from the sirup and filling the space between the pans and casings preserves a uniform temperature of the surface of the pans, and is rapidly condensed by coming in contact with the casings, and is drawn off from the bottom of the space M by the air-pump. The evaporating-pipes in the vacuum-pans and in those pans intended to be used either for evaporating or vacuum pans should be divided into series of two, three, or more, arranged one above another, each having an independent connection with the main steam-pipe for the purpose of graduating and regulating the amount and position of the heating-surface to suit the condition of the concentrating sirup at the bottom, middle, and upper portions thereof. When the sirup at the bottom of the pans is brought nearly to the concentrating-point, the steam is shut off from the lower series of evaporating-pipes, and so, also of the remaining series of evaporating-pipes to the top of the sirup, until it is all brought to the concentrating-point. By this arrangement of independent series of evaporating-pipes in sugar-pans, it will be perceived that we avoid all agitation of the sirup that has been brought to the concentrating-point.

The original cost of our improved sugar-pans will be fifty per cent. less than the pans in ordinary use, and but a trifle more than the common iron pan.

Having thus fully described our improvements in sugar-pans, what we claim therein as new, and desire to secure by Letters Patent, is—

1. The inclosing each evaporating and vacuum pan in a casing or jacket, leaving an interstitial space between the two communicating with an aperture at the top of the pan, with the air-pump at its base, substantially in the manner and for the purpose herein set forth.

2. The combination and arrangement of a series of sugar-pans with each other in such a manner that either one of them can at pleasure be used either as an evaporating or a vacuum pan, substantially in the manner herein set forth.

3. The exhausting the aqueous vapor from the space between the vacuum-pan and its casing through a pipe, G, passing in a series of coils through the evaporating-pan, and combined with the distributing trough or cylinder L, the pump J, and pipe $p$, connected with the bottom of the evaporating-pan, substantially in the manner and for the purpose herein set forth.

4. The placing two, three, or more series of evaporating-pipes in the pans independent of each other, arranged one above another, substantially in the manner and for the purpose herein set forth.

JOHN BENSON.
JAMES DAY.

Witnesses:
   Augs. H. Sidell,
   Dan. VanVoorhis.